US011338541B2

(12) United States Patent
Montanari et al.

(10) Patent No.: US 11,338,541 B2
(45) Date of Patent: May 24, 2022

(54) MULTILAYER TUBULAR STRUCTURE INTENDED FOR TRANSPORTING AN AIR-CONDITIONING FLUID

(71) Applicant: Arkema France, Colombes (FR)

(72) Inventors: Thibaut Montanari, Serquigny (FR); Nicolas Dufaure, Serquigny (FR); Marie Georgel, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 17/299,575

(22) PCT Filed: Dec. 3, 2019

(86) PCT No.: PCT/FR2019/052898
§ 371 (c)(1),
(2) Date: Jun. 3, 2021

(87) PCT Pub. No.: WO2020/115420
PCT Pub. Date: Jun. 11, 2020

(65) Prior Publication Data
US 2022/0055335 A1    Feb. 24, 2022

(30) Foreign Application Priority Data

Dec. 4, 2018 (FR) ...................................... 1872292

(51) Int. Cl.
| | |
|---|---|
| *B32B 1/08* | (2006.01) |
| *B32B 27/08* | (2006.01) |
| *B32B 27/30* | (2006.01) |
| *B32B 27/34* | (2006.01) |

(52) U.S. Cl.
CPC ................ *B32B 1/08* (2013.01); *B32B 27/08* (2013.01); *B32B 27/306* (2013.01); *B32B 27/34* (2013.01); *B32B 2307/732* (2013.01); *B32B 2597/00* (2013.01)

(58) Field of Classification Search
CPC ......... B32B 1/08; B32B 27/08; B32B 27/306; B32B 27/34; B32B 2307/732; B32B 2597/00
See application file for complete search history.

(56) References Cited

U.S. PATENT DOCUMENTS

2018/0080583 A1* 3/2018 Montanari ................ B32B 1/08

FOREIGN PATENT DOCUMENTS

| EP | 0342066 A1 | 11/1989 |
| EP | 2098365 A1 | 9/2009 |
| EP | 2098580 A1 | 9/2009 |
| WO | 2014114766 A1 | 7/2014 |
| WO | 2014125219 A1 | 8/2014 |
| WO | 2017103466 A1 | 6/2017 |
| WO | 2017121961 A1 | 7/2017 |

OTHER PUBLICATIONS

International Search Report (PCT/ISA/210) with translation and Written Opinion (PCT/ISA/237) dated Apr. 15, 2020, by the European Patent Office as the International Searching Authority for International Application No. PCT/FR2019/052898.

* cited by examiner

*Primary Examiner* — Michael C Miggins
(74) *Attorney, Agent, or Firm* — Buchanan Ingersoll & Rooney P.C.

(57) ABSTRACT

A multilayer tubular structure intended for transporting a heat-transfer fluid, the multilayer tubular structure including: a first layer including at least one long-chain polyamide having between 10 and 15 carbon atoms per nitrogen atom and including at least 50% aliphatic units relative to the sum of the units present in the long-chain polyamide; a second layer including at least one polyamide having between 4 and 9 carbon atoms per nitrogen atom, the polyamide including at least 50% aliphatic units relative to the sum of the units present in the polyamide; an optional layer, the first layer containing no continuous fibres, the second layer being in contact with the transported fluid when an optional layer is not present, and the layer or layers representing at least 50% of the total thickness of the tube.

31 Claims, No Drawings

MULTILAYER TUBULAR STRUCTURE INTENDED FOR TRANSPORTING AN AIR-CONDITIONING FLUID

The present invention relates to a multilayer tubular structure including at least one inner layer made of aliphatic polyamide and at least one outer layer made of aliphatic polyamide. The invention also relates to the use of this structure for transporting heat-transfer fluids, particularly refrigerant fluids selected from hydrocarbon compounds, hydrofluorocarbons, ethers, hydrofluoroethers, $CO_2$, $NH_3$, $SO_2$ and fluoroolefins, in particular R134, R-1234yf or R-1234ze, particularly R-1234yf or R-1234ze in the field of automotive air conditioning.

The tubular structures for transporting heat-transfer fluid in the field of automotive air conditioning require two competing properties that are respectively water permeability and hot burst (125° C.), which must be greater than 83 bars.

Accordingly, long-chain polyamides allow the first property to be met, which makes the use of short-chain polyamides unsuitable for this first property.

Nevertheless, these same short-chain polyamides deliver hot burst strength and in turn long-chain polyamides are unsuitable for this second property.

Moreover, the European F-Gas Directive plans for the progressive removal from the market of refrigerant gases with high global warming potential, GWP. From 100% in 2015, the quantity of refrigerant hydrofluorocarbon (HFC) fluids with a high GWP potential must move to 63% between 2018 and 2020 before reaching 21% in 2030.

Since January 2017, new automotive vehicles sold in Europe must be fitted with air conditioning running on R1234yf in their original build.

This standard is only valid in Europe for now but ought to be extended in the short-term to other regions like the USA.

The elements of circuits of air conditioning and in particular multilayer tubular structures) must also:
- be watertight to transported fluids and therefore have barrier properties to these fluids (and in particular to fluorocarbon refrigerant compounds such as R134, R-1234yf and R-1234ze), as well as to water and oxygen. The term barrier properties means that the structure is quasi impermeable to the fluids in automotive air-conditioning lines and therefore allows almost no emission of fluids from the air conditioning line into the atmosphere.
- demonstrate chemical resistance to transported fluids, compressor oils, water and oxygen, in order to avoid excessive degradation over the long term;
- not only have sufficient mechanical resistance (in particular resistance to bursting) but also sufficient flexibility in the event that both ends of the tube are linked to parts that can move in relation to each other (in particular in automotive air conditioning, where under-hood mounting and footprint constraints require bending of tubular structures) and allow vibration damping;
- demonstrate satisfactory thermal resistance, given that the transported fluids can be at a high temperature, and that the environmental temperature can also be high (in particular in automotive air conditioning, the parts concerned can be arranged in the vicinity of the engine) and in particular to $ZnCl_2$.

The structures described so far in the prior art for transporting fluids are mainly intended for transporting gasoline and much more rarely for transporting air-conditioning fluids such as a refrigerant.

Thus, patent EP2098580 describes structures for the transfer or storage of a fluid, comprising at least two layers, one of which consists of an adhesive composition, namely a mixture of long-chain, medium-chain and short-chain polyamides. These structures are more particularly for transporting gasoline.

Patent EP2098365 describes multilayer structures comprising at least two layers, one comprising at least one polymer and not comprising copper, and the other comprising at least one polymer and at least one stabilizer made of copper for the transport or storage of fluids. The polymer used in both layers is long-chain polyamide. These structures are more particularly for transporting fuel, in particular biodiesel.

International application WO 2014/114766 describes a structure comprising at least two layers, one of the two layers consisting of an adhesive composition comprising predominantly one or two polyamides selected from long-chain polyamides, medium-chain polyamides and short-chain polyamides.

These structures are more particularly for transporting fuels, including gasolines containing alcohol.

International application WO 2017/121961 describes multilayer tubular structures (MLT) comprising from the outside to the inside at least one barrier layer (1) made of EVOH or PPA and at least one inner layer (2) situated underneath the barrier layer and consisting of an aliphatic polyamide selected from a short-, medium- or long-chain polyamide.

These structures are intended for transporting fuels, in particular gasoline, including gasoline containing alcohol.

At present, tubing for the transport of refrigerant fluids in automotive air conditioning comprise rigid metal portions (usually aluminum) and flexible portions made of multilayer tubes. Some of these multilayer tubes are known as veneer tubes; they successively contain, from the outside to the inside, a first layer made of rubber-type elastomer, a reinforcement braid, a second layer of rubber-type elastomer and an inner layer made of polyamide.

Other tubular structures for transporting refrigerants in automotive air conditioning, other than veneer tubes, have recently been described.

Thus, international application WO 2014/125219 describes a thermoplastic structure comprising at least one layer consisting of a composition comprising a copolyamide having formula X/10.T/Y, in particular for automotive air conditioning. The proportion of X units being from 0.4 to 0.8 moles for one mole of 10.T and Y semi-aromatic units.

International application WO 2017/103466 describes structures for transporting heat-transfer fluids, particularly refrigerant fluids such as R134, R-1234yf or R-1234ze, particularly in the field of automotive air conditioning.

These structures comprise a fluid-contact layer comprising at least one semi-crystalline thermoplastic polymer $P_1$ and one layer comprising at least one semi-crystalline thermoplastic polymer $P_2$ and continuous fibers.

Polyamide P1 is particularly a copolymer of ethylene and vinyl alcohol (EVOH) or a semi-aromatic or short-chain polyamide.

Polyamide P2 is particularly a semi-aromatic or short- or long-chain polyamide.

However, the presence of continuous fibers in these structures requires their extrusion in several stages.

The tubular structures of the prior art and aluminum/rubber structures do not allow meeting all the criteria defined above, and particularly the combination of the first two properties defined above.

Therefore, there is a need to develop tubular structures for transporting transfer fluids, in particular refrigerants such as R-1234yf or R-1234ze, which allow meeting the above-defined specifications.

The present invention therefore relates to a multilayer tubular structure (MLT) intended for transporting a heat-transfer fluid, said multilayer tubular structure comprising:

at least one layer (1) comprising a composition (1) comprising predominantly at least one long-chain polyamide having 10 to 15 carbon atoms per nitrogen atom and comprising at least 50% of aliphatic units relative to the sum of the units present in said long-chain polyamide, at least one layer (2) situated underneath said layer (1) comprising a composition (2) comprising predominantly at least one polyamide having 4 to 9 carbon atoms per nitrogen atom, said polyamide comprising at least 50% aliphatic units relative to the sum of the units present in said polyamide, said composition (2) comprising up to 12% polyolefins, in particular up to 6% by weight of polyolefin, relative to the total weight of said composition (2), and up to 2% by weight of at least one plasticizer relative to the total weight of said composition (2), optionally, a layer (3) comprising a composition (3) as defined for composition (1), or comprising a composition (3') comprising predominantly a short-chain polyamide with 4 to 7 carbon atoms per nitrogen atom and at least 20%, preferably at least 25% by weight of at least one polyolefin relative to the total weight of said composition (3'), or a composition (4) comprising a polyamide comprising at least 50% semi-aromatic units, said layer (1) being devoid of continuous fibers, said layer (2) being in contact with said transported fluid when said layer (3) is not present, and said layer(s) (2) representing at least 50% of the total thickness of the tube.

The inventors have unexpectedly found that a tubular structure comprising at least one layer (1) comprising predominantly at least one long-chain polyamide with 10 to 15 carbon atoms per nitrogen atom and at least one layer (2) underneath layer (1) and comprising predominantly at least one polyamide with 4 to 9 carbon atoms per nitrogen atom allowed meeting the above-defined specification.

Regarding Layer (1) and Composition (1):

The expression "devoid of continuous fibers" means that layer (1) does not comprise continuous fibers, whether mineral fibers, polymeric or polymer fibers, or mixtures thereof.

The expression "continuous fibers" refers to continuous fibrous materials (particularly fiberglass or carbon fiber).

This means that the composition (1) comprising at least one C10 to C15 long-chain polyamide is devoid of continuous fibers but may comprise short or long fibers.

Advantageously, said layer (1) is devoid of fibers. Said fibers are defined as short, long or continuous fibers. This means that composition (1) in this embodiment, comprising at least one C10 to C15 long-chain polyamide, is devoid of continuous fibers and also devoid of short and long fibers.

The expression "comprising predominantly at least one polyamide . . ." means that the polyamide(s) is(are) present in composition (1) in a proportion by weight greater than 50% relative to the total weight of the composition.

The term "polyamide" refers equally to a homopolyamide or to a copolyamide.

The nomenclature used to define the polyamides is described in ISO standard 1874-1:2011 "Plastiques—Matériaux polyamides (PA) pour moulage et extrusion—Partie 1: Designation", in particular on page 3 (Tables 1 and 2) and is well known to the person skilled in the art.

The homopolyamide can be obtained from the polycondensation of lactam units, of amino acid units or of XY units, X being a diamine and Y a dicarboxylic acid (or diacid), as long as the homopolyamide has 10 to 15 carbon atoms per nitrogen atom.

The diamine can be linear or branched aliphatic, or cycloaliphatic, preferably linear or branched aliphatic, particularly linear.

The dicarboxylic acid can be aliphatic or cycloaliphatic, preferably aliphatic.

Consequently, the lactams and amino acids used to produce the homopolyamides must have a mean number of carbon atoms (C) per nitrogen atom (N) of between 10 and 15.

Advantageously, the lactams and amino acids are C11 and C12.

In the case where the homopolyamides are obtained from the polycondensation of XY units, the number of atoms per nitrogen atom is calculated from the mean of the number of carbon atoms present in the unit from diamine X and in the unit from diacid Y.

Consequently, the diamine (X) can be C4 to C36, particularly C6 to C18, particularly C4 to C12 and the dicarboxylic acid (Y) C4 to C36, particularly C6 to C18, particularly C6 to C12, as long as the mean of the number of carbon atoms present in the unit from the diamine X and in the unit from the diacid Y is comprised from 10 to 15.

Advantageously, the diamine is selected from 2-methyl-1,5-pentanediamine, 1,6-hexamethylenediamine, 1,7-heptanediamine, 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine.

Advantageously, the diamine is selected from 1,10-decanediamine and 1,12-dodecanediamine.

Advantageously, the dicarboxylic acid is selected from sebacic acid and dodecanedioic acid.

Advantageously, the diamine is selected from 1,10-decanediamine and 1,12-dodecanediamine and the dicarboxylic acid is selected from sebacic acid, undecanedioic acid and dodecanedioic acid.

In the case of copolyamides, the number of carbon atoms per nitrogen atom is calculated according to same principle as for a homopolyamide. The molar ratios of the various amide units are used for the calculation.

Consequently, the lactams and amino acids used to produce the copolyamides can have a mean number of carbon atoms (C) per nitrogen atom (N) comprised below 10, and particularly be comprised from 6 to 15.

The diamines X and diacids Y used in the copolyamides can be aromatic diamines and/or diacids as long as said polyamide of the composition (1) comprises at least 50% of aliphatic units relative to the sum of the units present in said polyamide.

In one embodiment, said at least one polyamide of composition (1) comprises at least 60% of aliphatic units relative to the sum of the units present in said polyamide.

In another embodiment, said at least one polyamide of composition (1) comprises at least 70% of aliphatic units relative to the sum of the units present in said polyamide.

In another embodiment, said at least one polyamide of composition (1) comprises at least 80% of aliphatic units relative to the sum of the units present in said polyamide.

In another embodiment, said at least one polyamide of composition (1) comprises at least 90% of aliphatic units relative to the sum of the units present in said polyamide.

In another embodiment, said at least one polyamide of composition (1) comprises 100% of aliphatic units relative to the sum of the units present in said polyamide. Said at least one polyamide of composition (1) therefore consists only of aliphatic units.

In one embodiment, said composition (1) comprises predominantly a single polyamide and therefore said single polyamide is present in the composition in a proportion by weight greater than 50% relative to the total weight of the composition.

In one embodiment, said polyamide of composition (1) comprises at least 60% of aliphatic units relative to the sum of the units present in said polyamide.

In another embodiment, said polyamide of composition (1) comprises at least 70% of aliphatic units relative to the sum of the units present in said polyamide.

In another embodiment, said polyamide of composition (1) comprises at least 80% of aliphatic units relative to the sum of the units present in said polyamide.

In another embodiment, said polyamide of composition (1) comprises at least 90% of aliphatic units relative to the sum of the units present in said polyamide.

In another embodiment, said polyamide of composition (1) comprises 100% of aliphatic units relative to the sum of the units present in said polyamide. Said polyamide of composition (1) therefore consists only of aliphatic units.

In one embodiment, said layer (1) consists of a composition (1) comprising predominantly at least one long-chain polyamide having 10 to 15 carbon atoms per nitrogen atom and comprising at least 50% of aliphatic units relative to the sum of the units present in said long-chain polyamide.

In one embodiment, said at least one polyamide of composition (1) comprises at least 60% of aliphatic units relative to the sum of the units present in said polyamide.

In another embodiment, said at least one polyamide of composition (1) comprises at least 70% of aliphatic units relative to the sum of the units present in said polyamide.

In another embodiment, said at least one polyamide of composition (1) comprises at least 80% of aliphatic units relative to the sum of the units present in said polyamide.

In another embodiment, said at least one polyamide of composition (1) comprises at least 90% of aliphatic units relative to the sum of the units present in said polyamide.

In another embodiment, said at least one polyamide of composition (1) comprises 100% of aliphatic units relative to the sum of the units present in said polyamide. Said polyamide therefore consists only of aliphatic units.

In one embodiment, said layer (1) consists of a composition (1) predominantly comprising a single polyamide and therefore said single polyamide is present in the composition in a proportion by weight greater than 50% relative to the total weight of the composition.

In one embodiment, said polyamide of composition (1) comprises at least 60% of aliphatic units relative to the sum of the units present in said polyamide.

In another embodiment, said polyamide of composition (1) comprises at least 70% of aliphatic units relative to the sum of the units present in said polyamide.

In another embodiment, said polyamide of composition (1) comprises at least 80% of aliphatic units relative to the sum of the units present in said polyamide.

In another embodiment, said polyamide of composition (1) comprises at least 90% of aliphatic units relative to the sum of the units present in said polyamide.

In another embodiment, said polyamide of composition (1) comprises 100% of aliphatic units relative to the sum of the units present in said polyamide. Said polyamide of composition (1) therefore consists only of aliphatic units.

Advantageously, in all the embodiments defined above for the composition (1) of layer (1), the lactam is selected from lauryl lactam, the amino acid is selected from aminoundecanoic acid, the diamine is selected from 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine and the dicarboxylic acid is selected from suberic acid, azelaic acid, sebacic acid, undecanedioic acid, dodecanedioic acid, brassylic acid, tetradecanedioic acid.

More advantageously, the lactam is lauryl lactam, the amino acid is aminoundecanoic acid, the diamine is selected from 1,10-decanediamine and 1,12-dodecanediamine and the dicarboxylic acid is selected from sebacic acid and dodecanedioic acid.

Said composition (1) can also comprise at least one polyolefin.

Said composition (1) can therefore comprise, in addition to said at least one polyamide, at least one polyolefin.

Advantageously, said composition (1) comprises up to 30% of at least one polyolefin.

The polyolefin can be functionalized or non-functionalized or be a mixture of at least one functionalized and/or least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. As examples, mention may be made of:
- the homopolymers and copolymers of polyethylene, particularly LDPE, HDPE, LLDPE (linear low-density polyethylene), VLDPE (very low density polyethylene) and metallocene polyethylene.
- homopolymers or copolymers of propylene.
- ethylene/alpha-olefin copolymers such as ethylene/propylene, EPRs (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers.
- copolymers of ethylene with at least one product selected from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) can be a polymer of alpha-olefins having reactive units (functionalities); such reactive units are acid, anhydride, or epoxy functions. As an example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or even by carboxylic acid anhydrides such as maleic anhydride. A functionalized polyolefin is for example a PE/EPR mixture, the ratio by weight whereof can vary widely, for example between 40/60 and 90/10, said mixture being co-grafted with an anhydride, in particular maleic anhydride, according to a graft rate for example of 0.01 to 5% by weight.

The functionalized polyolefin (B1) can be selected from the following, maleic anhydride or glycidyl methacrylate grafted, (co)polymers wherein the graft rate is for example from 0.01 to 5% by weight:
- of PE, of PP, of copolymers of ethylene with propylene, butene, hexene, or octene containing for example from 35 to 80% by weight of ethylene;
- ethylene/alpha-olefin copolymers such as ethylene/propylene, EPR (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers.
- ethylene and vinyl acetate copolymers (EVA), containing up to 40% by weight of vinyl acetate;
- ethylene and alkyl (meth)acrylate copolymers, containing up to 40% by weight of alkyl (meth)acrylate;
- ethylene and vinyl acetate (EVA) and alkyl (meth)acrylate copolymers, containing up to 40% by weight of comonomers.

The functionalized polyolefin (B1) can also be selected from ethylene/propylene copolymers with predominantly maleic anhydride grafted propylene condensed with a monoamine polyamide (or a polyamide oligomer) (products described in EP-A-0342066).

The functionalized polyolefin (B1) can also be a co- or terpolymer of at least the following units: (1) ethylene, (2) alkyl (meth)acrylate or vinyl ester of saturated carboxylic acid and (3) anhydride such as maleic anhydride or (meth) acrylic acid or epoxy such as glycidyl (meth)acrylate.

By way of example of functionalized polyolefins of the latter type, mention may be made of the following copolymers, where ethylene represents preferably at least 60% by weight and where the termonomer (the function) represents for example from 0.1 to 10% by weight of the copolymer:
- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and can be selected from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, MFI, and density of these polyolefins can also vary widely, which the person skilled in the art will know. MFI, abbreviation for Melt Flow Index, is a measure of fluidity when melted. It is measured according to standard ASTM 1238.

Advantageously the non-functionalized polyolefins (B2) are selected from homopolymers or copolymers of polypropylene and any ethylene homopolymer or ethylene copolymer and a higher alpha-olefin comonomer such as butene, hexene, octene or 4-methyl-1-pentene. Mention may be made for example of PP, high-density PE, medium-density PE, linear low-density PE, low-density PE, very low-density PE. These polyethylenes are known by the person skilled in the art as being products according to a "free-radical" method, according to a "Ziegler" catalysis method, or, more recently, from "metallocene" catalysis.

Advantageously, the functionalized polyolefins (B1) are selected selected from any polymer comprising alpha-olefin units and units bearing polar reactive functions such as epoxy, carboxylic acid or carboxylic acid anhydride functions. As examples of such polymers, mention may be made of terpolymers of ethylene, alkyl acrylate and maleic anhydride or glycidyl methacrylate like Lotader® from the Applicant or polyolefins grafted by maleic anhydride like Orevac® from the Applicant and terpolymers of ethylene, alkyl acrylate and (meth)acrylic acid. Mention may also be made of homopolymers or copolymers of polypropylene grafted by a carboxylic acid anhydride then condensed with polyamides or monoamine polyamide oligomers.

Advantageously, the polyolefin is an impact modifier. The impact modifier advantageously consists of a polymer with a flexural modulus below 100 MPa measured according to standard ISO 178: 2010, determined at 23° C. with relative humidity: RH50%, and Tg below 0° C. (measured according to standard 11357-2:2013 at the inflection point of the DSC thermogram).

Advantageously, said composition (1) comprises up to 40% of at least one polyolefin.

Advantageously, said composition (1) comprises at least 3% by weight of at least one polyolefin, particularly at least 6% by weight of at least one polyolefin, particularly from 6 to 20% by weight, even more particularly from 10 to 12% by weight of at least one polyolefin, relative to the total weight of said composition (1).

Said composition (1) can also comprise at least one plasticizer.

Said composition (1) can therefore comprise, in addition to said at least one polyamide, at least one plasticizer.

As an example, the plasticisers are selected from benzene sulfonamide derivatives, such as n-butylbenzenesulfonamide (BBSA); ethyl toluenesulfonamide or N-cyclohexyl toluenesulfonamide; hydroxybenzoic acid esters, such as 2-ethylhexyl parahydroxybenzoate and 2-decylhexyl parahydroxybenzoate; esters or ethers of tetrahydrofurfuryl alcohol, such as oligoethyleneoxytetrahydrofurfuryl alcohol; and esters of citric acid or of hydroxymalonic acid, such as oligoethyleneoxy malonate.

Using a mixture of plasticizers would not be outside the scope of the invention.

Advantageously, said composition (1) comprises up to 13% by weight of at least one plasticizer relative to the weight of said composition (1).

Said composition (1) can also comprise at least one additive.

The additives optionally used in the compositions of the invention are the conventional additives used in polyamides and are well known to a person skilled in the art and are described notably in EP 2098580.

For example, they comprise an anti-static filler selected from carbon black, graphite, carbon fibers, carbon nanotubes, in particular carbon black and carbon nanotubes, an antioxidant, a heat stabilizer, a UV absorber, a light stabilizer, a lubricant, an inorganic filler, a fire-proofing agent, a nucleating agent and a dye, reinforcing fibers, a wax and mixtures thereof.

As an example, the stabilizer can be a UV stabilizer, an organic stabilizer or more generally a combination of organic stabilizers, such as a phenol antioxidant (for example of the type Irganox® 245 or 1098 or 1010 by Ciba-BASF), a phosphite antioxidant (for example Irgafos® 126 and Irgafos® 168 by Ciba-BASF) and optionally other stabilizers such as a HALS, which means Hindered Amine Light Stabilizer (for example Tinuvin® 770 by Ciba-BASF), an anti-UV (for example Tinuvin® 312 by Ciba), or a phosphorus-based stabilizer. Amine antioxidants such as Crompton's Naugard® 445 or polyfunctional stabilizers such as Clariant's Nylostab® S-EED can also be used.

This stabilizer may also be a mineral stabilizer, such as a copper-based stabilizer. As an example of such mineral stabilizers, mention may be made of halides and copper acetates. Secondarily, other metals such as silver can optionally be considered, but these are known to be less effective. These compounds containing copper are typically associated with alkali metal halides, particularly potassium.

In one embodiment, said composition (1) comprises by weight:
  55% to 100% of at least one C10 to C15 long-chain polyamide as defined above;
  0 to 30% of at least one polyolefin;
  0 to 13% of at least one plasticizer;
  0 to 2% of at least one additive,
the total being 100% by weight.

In another embodiment, said composition (1) comprises by weight:
  55% to 97% of at least one C10 to C15 long-chain polyamide as defined above;
  3 to 30% of at least one polyolefin;
  0 to 13% of at least one plasticizer;
  0 to 2% of at least one additive
the total being 100% by weight.

In another embodiment, said composition (1) comprises by weight:
  65% to 94% of at least one C10 to C15 long-chain polyamide as defined above;
  6 to 20% of at least one polyolefin;
  0 to 13% of at least one plasticizer;
  0 to 2% of at least one additive
the total being 100% by weight.

Advantageously, said composition (1) is devoid of plasticizer and said composition (1) comprises by weight:
  68% to 100% of at least one C10 to C15 long-chain polyamide as defined above;
  0 to 30% of at least one polyolefin;
  0 to 2% of at least one additive,
the total being 100% by weight.

More advantageously, said composition (1) comprises by weight:
  68% to 97% of at least one C10 to C15 long-chain polyamide as defined above;
  3 to 30% of at least one polyolefin;
  0 to 2% of at least one additive,
the total being 100% by weight.

Even more advantageously, said composition (1) comprises by weight:
  78% to 94% of at least one C10 to C15 long-chain polyamide as defined above;
  6 to 20% of at least one polyolefin;
  0 to 2% of at least one additive
the total being 100% by weight.

It is clearly obvious that the different compositions (1) comprising or not comprising at least one polyolefin and/or at least one plasticizer and/or at least one additive refer to all the embodiments described above.

In one embodiment, said at least one polyamide of layer (1) of the above-defined tubular structure is selected from PA11, PA12, PA1010, PA1012, PA1210 and PA1212.

Layer (1) of the above-defined tubular structure can be the outermost layer.

Advantageously, said layer (1) of the above-defined tubular structure is the outermost layer of said structure.

Advantageously, said structure (1) comprises a single layer (1).

Regarding Layer (2) and Composition (2):

The expression "comprising predominantly at least one polyamide . . . " is as defined above for layer (1).

In the same way, the term "polyamide" refers equally to a homopolyamide or to a copolyamide.

The homopolyamide can be obtained from the polycondensation of lactam units, of amino acid units or of XY units, X being a diamine and Y a dicarboxylic acid (or diacid), as long as the homopolyamide has 4 to 9 carbon atoms per nitrogen atom.

The diamine can be linear or branched aliphatic, or cycloaliphatic, preferably linear or branched aliphatic, particularly linear.

The dicarboxylic acid can be aliphatic or cycloaliphatic, preferably aliphatic.

Consequently, the lactams and amino acids used to produce the homopolyamides must have a mean number of carbon atoms (C) per nitrogen atom (N) of between 4 and 9.

Advantageously, the lactams and amino acids are C6.

In the case where the homopolyamides are obtained from the polycondensation of XY units, the number of atoms per nitrogen atom is calculated from the mean of the number of carbon atoms present in the unit from diamine X and in the unit from diacid Y.

Consequently, the diamine (X) can be C4 to C14, particularly C4 to C12, particularly C4 to C10 and the dicarboxylic acid (Y) C4 to C14, particularly C4 to C12, particularly C4 to C10, as long as the mean of the number of carbon atoms present in the unit from the diamine X and in the unit from the diacid Y is comprised from 4 to 9.

Advantageously, the diamine is selected from butanediamine, pentanediamine, 2-methyl-1,5-pentanediamine, 1,6-hexamethylenediamine, 1,7-heptanediamine, 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, in particular 1,6-hexamethylenediamine.

Advantageously, the dicarboxylic acid is selected from succinic acid, pentanedioic acid, adipic acid, suberic acid, azelaic acid, sebacic acid, undecanedioic acid, dodecanedioic acid, brassylic acid, tetradecanedioic acid, in particular sebacic acid and dodecanedioic acid.

Advantageously, the diamine is selected from butanediamine, pentanediamine, 2-methyl-1,5-pentanediamine, 1,6- hexamethylenediamine 1,7-heptanediamine, 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, in particular 1,6-hexamethylenediamine, and the dicarboxylic acid is selected from succinic acid, pentanedioic acid, adipic acid, suberic acid, azelaic acid, sebacic acid, undecanedioic acid, dodecanedioic acid, brassylic acid, tetradecanedioic acid, in particular sebacic acid and dodecanedioic acid.

The diamines X and diacids Y used in the copolyamides can be aromatic diamines and/or diacids as long as said polyamide of the composition (2) comprises at least 50% of aliphatic units relative to the sum of the units present in said polyamide.

In one embodiment, said at least one polyamide of composition (2) comprises at least 60% of aliphatic units relative to the sum of the units present in said polyamide.

In another embodiment, said at least one polyamide of composition (2) comprises at least 70% of aliphatic units relative to the sum of the units present in said polyamide.

In another embodiment, said at least one polyamide of composition (2) comprises at least 80% of aliphatic units relative to the sum of the units present in said polyamide.

In another embodiment, said at least one polyamide of composition (2) comprises at least 90% of aliphatic units relative to the sum of the units present in said polyamide.

In another embodiment, said at least one polyamide of composition (2) comprises 100% of aliphatic units relative to the sum of the units present in said polyamide. Said at least one polyamide therefore consists only of aliphatic units.

In one embodiment, said composition (2) comprises predominantly a single polyamide and therefore said single polyamide is present in the composition in a proportion by weight greater than 50% relative to the total weight of the composition.

In one embodiment, said polyamide of said composition (2) comprises at least 60% of aliphatic units relative to the sum of the units present in said polyamide.

In another embodiment, said polyamide of said composition (2) comprises at least 70% of aliphatic units relative to the sum of the units present in said polyamide.

In another embodiment, said polyamide of said composition (2) comprises at least 80% of aliphatic units relative to the sum of the units present in said polyamide.

In another embodiment, said polyamide of said composition (2) comprises at least 90% of aliphatic units relative to the sum of the units present in said polyamide.

In another embodiment, said polyamide of said composition (2) comprises 100% of aliphatic units relative to the sum of the units present in said polyamide. Said polyamide of said composition (2) therefore consists only of aliphatic units.

In one embodiment, said layer (2) consists of a composition (2) comprising predominantly at least one long-chain polyamide having 4 to 9 carbon atoms per nitrogen atom and comprising at least 50% of aliphatic units relative to the sum of the units present in said long-chain polyamide.

In one embodiment, said at least one polyamide of said composition (2) comprises at least 60% of aliphatic units relative to the sum of the units present in said polyamide.

In another embodiment, said at least one polyamide of said composition (2) comprises at least 70% of aliphatic units relative to the sum of the units present in said polyamide.

In another embodiment, said at least one polyamide of said composition (2) comprises at least 80% of aliphatic units relative to the sum of the units present in said polyamide.

In another embodiment, said at least one polyamide of said composition (2) comprises at least 90% of aliphatic units relative to the sum of the units present in said polyamide.

In another embodiment, said at least one polyamide of said composition (2) comprises 100% of aliphatic units relative to the sum of the units present in said polyamide. Said polyamide of said composition (2) therefore consists only of aliphatic units.

In one embodiment, said layer (2) consists of a composition (2) comprising predominantly a single polyamide and therefore said single polyamide is present in the composition in a proportion by weight greater than 50% relative to the total weight of the composition.

In one embodiment, said polyamide of said composition (2) comprises at least 60% of aliphatic units relative to the sum of the units present in said polyamide.

In another embodiment, said polyamide of said composition (2) comprises at least 70% of aliphatic units relative to the sum of the units present in said polyamide.

In another embodiment, said polyamide of said composition (2) comprises at least 80% of aliphatic units relative to the sum of the units present in said polyamide.

In another embodiment, said polyamide of said composition (2) comprises at least 90% of aliphatic units relative to the sum of the units present in said polyamide.

In another embodiment, said polyamide of said composition (2) comprises 100% of aliphatic units relative to the sum of the units present in said polyamide. Said polyamide therefore consists only of aliphatic units.

Advantageously, in all the embodiments defined above for composition (2) of layer (2), the lactam is caprolactam, the amino acid aminohexanoic acid, the diamine is selected from 2-methyl-1,5-pentanediamine, 1,6-hexamethylenediamine, 1,7-heptanediamine, 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine and the dicarboxylic acid is selected from adipic acid, sebacic acid, undecanedioic acid, dodecanedioic acid, brassylic acid, tetradecanedioic acid.

More advantageously, the lactam is caprolactam, the amino acid is aminohexanoic acid, the diamine is selected from 2-methyl-1,5-pentanediamine, 1,6-hexamethylenediamine, 1,10-decanediamine and 1,12-dodecanediamine and the dicarboxylic acid is selected from adipic acid, sebacic acid and dodecanedioic acid.

In one embodiment, the lactam is caprolactam, the amino acid is aminohexanoic acid, the diamine is selected from 2-methyl-1,5-pentanediamine, 1,6-hexamethylenediamine, 1,10-decanediamine and 1,12-dodecanediamine and the dicarboxylic acid is selected from adipic acid, sebacic acid and dodecanedioic acid.

Said composition (2) can also comprise at least one polyolefin in a proportion by weight up to 12% relative to the total weight of the composition, in particular up to 6% relative to the total weight of the composition.

The polyolefin is as defined for composition (1).

Said composition (2) can also comprise at least one plasticizer in a proportion by weight up to 2% relative to the total weight of the composition.

The plasticizer is as defined for composition (1).

Said composition (2) can also comprise at least one additive.

In one embodiment, the additive is in a proportion by weight of up to 2% of the total weight of the composition.

The additive is as defined for composition (1).

In one embodiment, said composition (2) comprises by weight:
- 84% to 100%, in particular 90% to 100%, of at least one C4 to C9 polyamide as defined above;
- 0 to 12% of at least one polyolefin, in particular 0 to 6% of at least one polyolefin,
- 0 to 2% of at least one plasticizer;
- 0 to 2% of at least one additive, the total being 100% by weight.

In another embodiment, said composition (2) is devoid of polyolefin and comprises by weight:
- 96% to 100% of at least one C4 to C9 polyamide as defined above;
- 0 to 2% of at least one plasticizer;
- 0 to 2% of at least one additive the total being 100% by weight.

Advantageously, said composition (2) is devoid of plasticizer and said composition (2) comprises by weight:
- 86% to 100% of at least one C4 to C9 polyamide as defined above, in particular 92 to 100% by weight;
- 0 to 12% of at least one polyolefin, in particular 0 to 6% of at least one polyolefin,
- 0 to 2% of at least one additive, the total being 100% by weight.

It is clearly obvious that the different compositions (2) comprising or not comprising at least one polyolefin and/or at least one plasticizer and/or at least one additive refer to all the embodiments described above for composition (2).

In one embodiment, said at least one polyamide of layer (2) of the above-defined tubular structure is selected from PA6, PA66, PA6/66, PA610, PA410, PA412 and PA612.

Regarding Optional Layer (3) and Composition (3)

An inner layer (3) may be present in the above-defined tubular structure.

In one embodiment, said layer (3) is present and said layer (3) is internal and in contact with said transported fluid.

Layer (3) comprises a composition (3) as defined for composition (1) above, or as defined for composition (2) above or a composition (3') comprising predominantly a short-chain polyamide with 4 to 7 carbon atoms per nitrogen atom and at least 20%, preferably at least 25%, by weight of at least one polyolefin relative to the total weight of said composition (3'), or a composition (4) comprising at least 50% aromatic units.

In the same way, the term "short-chain polyamide" in composition (3') refers equally to a homopolyamide or to a copolyamide.

The homopolyamide can be obtained from the polycondensation of lactam units, of amino acid units or of XY units, X being a diamine and Y a dicarboxylic acid (or diacid), as long as the homopolyamide has 4 to 7 carbon atoms per nitrogen atom.

The diamine can be linear or branched aliphatic, or cycloaliphatic, preferably linear or branched aliphatic, particularly linear.

The dicarboxylic acid can be aliphatic or cycloaliphatic, preferably aliphatic.

Consequently, the lactams and amino acids used to produce the homopolyamides must have a mean number of carbon atoms (C) per nitrogen atom (N) of between 4 and 7.

Advantageously, the lactams and amino acids are C6.

In the case where the homopolyamides are obtained from the polycondensation of XY units, the number of atoms per nitrogen atom is calculated from the mean of the number of carbon atoms present in the unit from diamine X and in the unit from diacid Y.

Consequently, the diamine (X) can be C4 to C10, particularly C4 to C7, particularly C4 to C6 and the dicarboxylic acid (Y) C4 to C10, particularly C4 to C7, particularly C4 to C6, as long as the mean of the number of carbon atoms present in the unit from the diamine X and in the unit from the diacid Y is comprised from 4 to 7.

Advantageously, the diamine is selected from butanediamine, pentanediamine, 2-methyl-1,5-pentanediamine, 1,6-hexamethylenediamine, 1,7-heptanediamine, 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine, in particular 2-methyl-1,5-pentanediamine and 1,6-hexamethylenediamine.

Advantageously, the dicarboxylic acid is selected from succinic acid, pentanedioic acid, adipic acid, suberic acid, azelaic acid, sebacic acid.

Advantageously, the diamine is selected from 2-methyl-1,5-pentanediamine, 1,6-hexamethylenediamine, 1,7-heptanediamine, 1,8-octanediamine, 1,9-nonanediamine, 2-methyl-1,8-octane-diamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine, 1,13-tridecanediamine and 1,14-tetradecanediamine, and the dicarboxylic acid is selected from adipic acid, suberic acid, azelaic acid, sebacic acid, undecanedioic acid, in particular sebacic acid.

Advantageously, said layer (3) is devoid of continuous fibers.

Advantageously, said layer (1) and said layer (3) are devoid of fibers.

The term "fibers" is as defined above.

Said composition (3') of layer (3) comprises at least 20% by weight, preferably at least 25% by weight of at least one polyolefin.

The polyolefin is as defined for composition (1).

Said composition (3') can also comprise at least one plasticizer and/or at least one additive.

The plasticizer and the additive are as defined above.

In one embodiment, said composition (3') comprises by weight:
- 54% to 80% of at least one C4 to C9 long-chain polyamide as defined above, in particular 54% to 75%;
- to 40%, preferably 25 to 40% of at least one polyolefin;
- 0 to 4% of at least one plasticizer;
- 0 to 2% of at least one additive the total being 100% by weight.

The polyamide of composition (4) comprising at least 50% of semi-aromatic units can be a polyphthalamide, in particular PA11/10T, the 10T unit then representing 50% by weight of the total weight of the copolyamide.

In one embodiment, the inner layer (3) when present is devoid of polyamide of composition (4) comprising at least 50% of semi-aromatic units.

Tubular Structure:

The tubular structure can comprise at least one layer (1), at least one layer (2) and optionally an inner layer (3).

In the case where the tubular structure is devoid of layer (3), layer (2) is in contact with the transported fluid.

The tubular structure therefore comprises at least one layer (1) and at least one layer (2). The tubular structure of the invention can therefore comprise several layers (2).

Regardless of the number of layers present in the tubular structure, said layer (2) or the set of said layers (2) represents at least 50% of the thickness of the tube.

Regardless of the number of layers present in the tubular structure, said layer (2) or the set of said layers (2) represents at least 60% of the thickness of the tube.

Regardless of the number of layers present in the tubular structure, said layer (2) or the set of said layers (2) represents at least 70% of the thickness of the tube, in particular 70% to 95% of the thickness of the tube.

Adhesion between adjacent layers, if necessary, is ensured by a layer of binder.

Advantageously, the tubular structure is devoid of binder layer.

In the case where layer (3) is present, said layer (3) can be the layer in contact with the transported fluid and the tubular structure comprises at least three layers.

Advantageously, said layer (3) is the layer in contact with the transported fluid.

Advantageously, said layer (1) and said composition (2) are devoid of plasticizer.

Advantageously, all layers present in the tubular structure are devoid of plasticizer.

In one embodiment, said inner layer (3) is present in the structure the multilayer tubular structure defined above, said composition (3) being identical to composition (1).

Advantageously, said at least one polyamide of layer (3) of the above-defined tubular structure when present is selected from PA11, PA12, PA11/10T, PA6, PA66, PA6/66, PA610, PA410, PA412 and PA612.

Advantageously, said layer (3) is devoid of aromatic units.

More preferably, said at least one polyamide of layer (3), when present, is selected from PA11, PA12, PA6, PA66, PA6/66, PA610, PA410, PA412 and PA612.

Advantageously, said at least one polyamide with 4 to 9 carbon atoms per nitrogen atom of said composition (2) of said multilayer tubular structure comprises at least 60% aliphatic units relative to the sum of the units present in said polyamide and said long-chain polyamide of said composition (1) comprises at least 60% aliphatic units relative to the sum of the units present in said long-chain polyamide.

Advantageously, said at least one polyamide with 4 to 9 carbon atoms per nitrogen atom of said composition (2) of said multilayer tubular structure comprises at least 60% aliphatic units relative to the sum of the units present in said polyamide and said long-chain polyamide of said composition (1) comprises at least 70% aliphatic units relative to the sum of the units present in said long-chain polyamide.

Advantageously, said at least one polyamide with 4 to 9 carbon atoms per nitrogen atom of said composition (2) of said multilayer tubular structure comprises at least 60% aliphatic units relative to the sum of the units present in said polyamide and said long-chain polyamide of said composition (1) comprises at least 80% aliphatic units relative to the sum of the units present in said long-chain polyamide.

Advantageously, said at least one polyamide with 4 to 9 carbon atoms per nitrogen atom of said composition (2) of said multilayer tubular structure comprises at least 60% aliphatic units relative to the sum of the units present in said polyamide and said long-chain polyamide of said composition (1) comprises at least 90% aliphatic units relative to the sum of the units present in said long-chain polyamide.

Advantageously, said at least one polyamide with 4 to 9 carbon atoms per nitrogen atom of said composition (2) of said multilayer tubular structure comprises at least 60% aliphatic units relative to the sum of the units present in said polyamide and said long-chain polyamide of said composition (1) comprises at least 100% aliphatic units relative to the sum of the units present in said long-chain polyamide.

Said composition (1) comprises 100% aliphatic units, therefore meaning that said composition consists of 100% aliphatic units.

Advantageously, said at least one polyamide with 4 to 9 carbon atoms per nitrogen atom of said composition (2) of said multilayer tubular structure comprises at least 70% aliphatic units relative to the sum of the units present in said polyamide and said long-chain polyamide of said composition (1) comprises at least 60% aliphatic units relative to the sum of the units present in said long-chain polyamide.

Advantageously, said at least one polyamide with 4 to 9 carbon atoms per nitrogen atom of said composition (2) of said multilayer tubular structure comprises at least 70% aliphatic units relative to the sum of the units present in said polyamide and said long-chain polyamide of said composition (1) comprises at least 70% aliphatic units relative to the sum of the units present in said long-chain polyamide.

Advantageously, said at least one polyamide with 4 to 9 carbon atoms per nitrogen atom of said composition (2) of said multilayer tubular structure comprises at least 70% aliphatic units relative to the sum of the units present in said polyamide and said long-chain polyamide of said composition (1) comprises at least 80% aliphatic units relative to the sum of the units present in said long-chain polyamide.

Advantageously, said at least one polyamide with 4 to 9 carbon atoms per nitrogen atom of said composition (2) of said multilayer tubular structure comprises at least 70% aliphatic units relative to the sum of the units present in said polyamide and said long-chain polyamide of said composition (1) comprises at least 90% aliphatic units relative to the sum of the units present in said long-chain polyamide.

Advantageously, said at least one polyamide with 4 to 9 carbon atoms per nitrogen atom of said composition (2) of said multilayer tubular structure comprises at least 70% aliphatic units relative to the sum of the units present in said polyamide and said long-chain polyamide of said composition (1) comprises at least 100% aliphatic units relative to the sum of the units present in said long-chain polyamide.

Advantageously, said at least one polyamide with 4 to 9 carbon atoms per nitrogen atom of said composition (2) of said multilayer tubular structure comprises at least 80% aliphatic units relative to the sum of the units present in said polyamide and said long-chain polyamide of said composition (1) comprises at least 60% aliphatic units relative to the sum of the units present in said long-chain polyamide.

Advantageously, said at least one polyamide with 4 to 9 carbon atoms per nitrogen atom of said composition (2) of said multilayer tubular structure comprises at least 80% aliphatic units relative to the sum of the units present in said polyamide and said long-chain polyamide of said composition (1) comprises at least 70% aliphatic units relative to the sum of the units present in said long-chain polyamide.

Advantageously, said at least one polyamide with 4 to 9 carbon atoms per nitrogen atom of said composition (2) of said multilayer tubular structure comprises at least 80% aliphatic units relative to the sum of the units present in said polyamide and said long-chain polyamide of said composition (1) comprises at least 80% aliphatic units relative to the sum of the units present in said long-chain polyamide.

Advantageously, said at least one polyamide with 4 to 9 carbon atoms per nitrogen atom of said composition (2) of said multilayer tubular structure comprises at least 80% aliphatic units relative to the sum of the units present in said polyamide and said long-chain polyamide of said composition (1) comprises at least 90% aliphatic units relative to the sum of the units present in said long-chain polyamide.

Advantageously, said at least one polyamide with 4 to 9 carbon atoms per nitrogen atom of said composition (2) of said multilayer tubular structure comprises at least 80% aliphatic units relative to the sum of the units present in said polyamide and said long-chain polyamide of said composition (1) comprises at least 100% aliphatic units relative to the sum of the units present in said long-chain polyamide.

Advantageously, said at least one polyamide with 4 to 9 carbon atoms per nitrogen atom of said composition (2) of said multilayer tubular structure comprises at least 90% aliphatic units relative to the sum of the units present in said polyamide and said long-chain polyamide of said composition (1) comprises at least 60% aliphatic units relative to the sum of the units present in said long-chain polyamide.

Advantageously, said at least one polyamide with 4 to 9 carbon atoms per nitrogen atom of said composition (2) of said multilayer tubular structure comprises at least 90% aliphatic units relative to the sum of the units present in said polyamide and said long-chain polyamide of said composition (1) comprises at least 70% aliphatic units relative to the sum of the units present in said long-chain polyamide.

Advantageously, said at least one polyamide with 4 to 9 carbon atoms per nitrogen atom of said composition (2) of said multilayer tubular structure comprises at least 90% aliphatic units relative to the sum of the units present in said polyamide and said long-chain polyamide of said composition (1) comprises at least 80% aliphatic units relative to the sum of the units present in said long-chain polyamide.

Advantageously, said at least one polyamide with 4 to 9 carbon atoms per nitrogen atom of said composition (2) of said multilayer tubular structure comprises at least 90% aliphatic units relative to the sum of the units present in said polyamide and said long-chain polyamide of said composition (1) comprises at least 90% aliphatic units relative to the sum of the units present in said long-chain polyamide.

Advantageously, said at least one polyamide with 4 to 9 carbon atoms per nitrogen atom of said composition (2) of said multilayer tubular structure comprises at least 90% aliphatic units relative to the sum of the units present in said polyamide and said long-chain polyamide of said composition (1) comprises at least 100% aliphatic units relative to the sum of the units present in said long-chain polyamide.

Advantageously, said at least one polyamide with 4 to 9 carbon atoms per nitrogen atom of said composition (2) of said multilayer tubular structure comprises at least 100% aliphatic units relative to the sum of the units present in said polyamide and said long-chain polyamide of said composition (1) comprises at least 60% aliphatic units relative to the sum of the units present in said long-chain polyamide.

Said composition (2) comprises 100% aliphatic units, therefore meaning that said composition consists of 100% aliphatic units.

Advantageously, said at least one polyamide with 4 to 9 carbon atoms per nitrogen atom of said composition (2) of said multilayer tubular structure comprises at least 100% aliphatic units relative to the sum of the units present in said polyamide and said long-chain polyamide of said composition (1) comprises at least 70% aliphatic units relative to the sum of the units present in said long-chain polyamide.

Advantageously, said at least one polyamide with 4 to 9 carbon atoms per nitrogen atom of said composition (2) of said multilayer tubular structure comprises at least 100% aliphatic units relative to the sum of the units present in said polyamide and said long-chain polyamide of said composition (1) comprises at least 80% aliphatic units relative to the sum of the units present in said long-chain polyamide.

Advantageously, said at least one polyamide with 4 to 9 carbon atoms per nitrogen atom of said composition (2) of said multilayer tubular structure comprises at least 100% aliphatic units relative to the sum of the units present in said polyamide and said long-chain polyamide of said composition (1) comprises at least 90% aliphatic units relative to the sum of the units present in said long-chain polyamide.

Advantageously, said at least one polyamide with 4 to 9 carbon atoms per nitrogen atom of said composition (2) of said multilayer tubular structure comprises at least 100% aliphatic units relative to the sum of the units present in said polyamide and said long-chain polyamide of said composition (1) comprises at least 100% aliphatic units relative to the sum of the units present in said long-chain polyamide.

In one embodiment, said composition (2) of the above-defined tubular structure is devoid of polyamides other than aliphatic polyamides.

In another embodiment, said composition (2) and said composition (1) of the above-defined tubular structure are devoid of polyamides other than aliphatic polyamides.

In a variant of the invention, the above-defined multilayer tubular structure, characterized in that two layers (2) are present and separated by a layer consisting of ethylene vinyl alcohol (EVOH) copolymer.

In this case, the thickness of the two layers (2) always represents at least 50%, preferably at least 60%, preferably at least 70%, in particular from 70 to 95% of the total thickness.

In one embodiment, the multilayer tubular structure as defined above is characterized in that the heat-transfer fluid is a refrigerant fluid selected from hydrocarbon, hydrofluorocarbon, ether, hydrofluoroether, $CO_2$, $NH_3$, $SO_2$ and fluoroolefin compounds.

In one embodiment, the heat-transfer fluid is a refrigerant fluid selected from $CO_2$, fluoropropenes, fluoropropanes and fluoroethanes, preferably from among 1,3,3,3-tetrafluoropropene, 2,3,3,3-tetrafluoropropene, 1,2,3,3,3-pentafluoropropene, 1,1,3,3-tetrafluoropropene, 3,3,3-trifluoropropene, 2,3,3-trifluoropropene, 1,1,1,2-tetrafluoroethane, 1,1,2,2-tetrafluoroethane, pentafluoroethane, difluoromethane, 1,1-difluoroethane, 1,1,1,2,3,3,3-heptafluoropropane, 1,1,1-trifluoropropane, 1,1,1,3,3,3-hexafluoropropane, 1,1,1,3,3-pentafluoropropane, 1,1,1,3,3-pentafluorobutane, trifluoroiodomethane and mixtures thereof.

In one embodiment, the heat-transfer fluid is a refrigerant fluid selected from 1,3,3,3-tetrafluoropropene (1234ze) and 2,3,3,3-tetrafluoropropene (1234yf), where particularly the heat-transfer fluid is 2,3,3,3-tetrafluoropropene (1234yf).

Advantageously, said refrigerant fluid contains a lubricant, preferably selected from mineral oils, silicone oils, natural paraffins, naphthenes, synthetic paraffins, alkylbenzenes, polyalphaolefins, polyalkylene glycols, polyol esters and/or polyvinylethers; the lubricant being in a more particularly preferred way a polyalkylene glycol or a polyol ester.

According to another aspect, the present invention relates to the use of a multilayer tubular structure as defined above, for transporting a heat-transfer fluid.

According to another aspect, the present invention relates to the use of a multilayer tubular structure as defined above, in order to satisfy an extractable test, said test particularly consisting of filling said multilayer tubular structure MLT with Forane and heating the assembly at 60° C. for 96 hours, then emptying it by filtering it into a beaker, then allowing the filtrate from the beaker to evaporate at ambient temperature and finally weighing this residue, the proportion of which must be less than or equal to approximately 6 g/m² of internal tube surface, and the proportion of residue on the filter being less than or equal to 1 g/m², more preferably less than or equal to 0.5 g/m².

In other words, the present invention relates to the use of a multilayer tubular structure as defined above, for reducing the proportion of soluble and insoluble compounds released by a tubular structure as defined above, after putting said multilayer tubular structure MLT in contact with Forane, said proportion of released compound being determined by an extractable test, said test particularly consisting of filling said multilayer tubular structure MLT with Forane and heating the assembly at 60° C. for 96 hours, then emptying it by filtering it into a beaker, then allowing the filtrate from the beaker to evaporate at ambient temperature and finally weighing this residue, the proportion of which must be less than or equal to approximately 6 g/m² of internal tube surface, preferably less than or equal to 1 g/m², preferably less than or equal to 0.5 g/m².

Said tubular structure therefore decreases the proportion of soluble and insoluble compounds after contact with Forane compared to the structures of the prior art.

EXAMPLES

The invention will now be illustrated by the following examples without being in any way limited to these.

The following structures were prepared by extrusion:

The multi-layer tubes are manufactured by co-extrusion. An industrial McNeil multilayer extrusion line is used, equipped with 5 extruders, connected to a multilayer extrusion head with spiral mandrels.

The screws used are extrusion monoscrews having screw profiles adapted to polyamides. In addition to the 5 extruders and the multilayer extrusion head, the extrusion line comprises:

a die-punch assembly, located at the end of the coextrusion head; the internal diameter of the die and the external diameter of the punch are selected according to the structure to be produced and the materials of which it is composed, as well as the dimensions of the tube and the line speed;

a vacuum tank with an adjustable vacuum level. In this tank water circulates generally maintained at 20° C., in which a gauge is submerged making it possible to shape the tube to its final dimensions. The diameter of the gauge is adapted to the dimensions of the tube to be produced, typically from 8.5 to 10 mm for a tube with an external diameter of 8 mm and a thickness of 1 mm;

a succession of cooling tanks in which water is maintained at around 20° C., allowing the tube to be cooled along the path from the head to the drawing bench;

a diameter meter;

a drawing bench.

The configuration with 5 extruders is used to produce tubes ranging from 2 layers to 5 layers. In the case of structures whose number of layers is less than 5, several extruders are then fed with the same material.

In the case of structures comprising 6 layers, an additional extruder is connected and a spiral mandrel is added to the existing head, in order to make the inner layer, in contact with the fluid.

Before the tests, in order to ensure the best properties for the tube and good extrusion quality, it is verified that the extruded materials have a residual moisture content before extrusion of less than 0.08%. Otherwise, an additional step of drying the material before the tests, generally in a vacuum dryer, is carried out overnight at 80° C.

The tubes, which satisfy the characteristics disclosed in the present patent application, were removed, after stabilization of the extrusion parameters, the dimensions of the tubes in question no longer changing over time. The diameter is controlled by a laser diameter meter installed at the end of the line.

Generally, the line speed is typically 20 m/min. It generally ranges from 5 to 100 m/min.

The screw speed of the extruders depends on the thickness of the layer and on the diameter of the screw as is known to those skilled in the art.

In general, the temperatures of the extruders and of the tools (head and connector) must be adjusted so as to be sufficiently higher than the melting temperature of the compositions in question, so that they remain in the molten state, thus preventing them from solidifying and jamming the machine.

The tubular structures were tested on different parameters shown in Table 1.

TABLE 1

|  |  |  | Burst at 125° C.* | Water perm.** | Air-conditioning fluid barrier*** | ZnCl₂ resistance**** |
|---|---|---|---|---|---|---|
| Ex1 | CPA11/CPA610/CPA11 | 150/1350/150 μm | B | TB | OK | OK |
| Ex2 | CPA11/CPA610/CPA6POF | 150/1350/150 μm | B | TB | OK | OK |
| Ex3 | CPA11/CPA610 | 150/1500 μm | B | TB | OK | OK |
| Ex4 | CPA11/CPA66/CPA11 | 150/1350/150 μm | TB | AB | OK | OK |
| Ex5 | CPA11/CPA66 | 150/1500 μm | TB | AB | OK | OK |
| Ex6 | CPA11/CPA610/CPA66 | 150/750/750 μm | TB | B | OK | OK |
| Ex7 | CPA11/CPA610/CPA66/CPA610/CPA11 | 150/300/750/300/150 | TB | B | OK | OK |
| Ex8 | CPA11/CPA610/CPA11 10TPOF | 150/1350/150 μm | B | TB | OK | OK |

TABLE 1-continued

|  |  | Burst at 125° C.* | Water perm.** | Air-conditioning fluid barrier*** | ZnCl₂ resistance**** |
|---|---|---|---|---|---|
| Counter-Ex1 | Monolayer CPA66 | 1650 μm | TB | Mv | OK | NOK |
| Counter-Ex2 | Monolayer CPA66plast | 1650 μm | TB | Mv | NOK | NOK |
| Counter-Ex3 | CPA11/CPA610POF/CPA11 | 150/1350/150 μm | Mu | B | OK | OK |
| Counter-Ex4 | CPA11/CPA610plast/CPA11 | 150/1350/150 μm | Mv | B | NOK | OK |
| Counter-Ex5 | CPA111/CPA66/CPA11 | 450/750/450 μm | Mv | TB | OK | OK |

Example 6 consists of, from left to right, one layer (1) and two layers (2).

Example 7 consists of, from left to right, one layer (1), three successive layers (2) (total thickness of layers (2)=1350 μm), and one layer (3).

The measurement methods and values corresponding to scoring are specified in Table 2

TABLE 2

|  | Very good (VG) | Good (G) | Limited (AB) | Poor (P) |
|---|---|---|---|---|
| (*) Burst is the burst pressure in bars of a tube at 125° C. conditioned in 50% water for 15 days (according to DIN 53758). | >93 | 93-83 | 82-80 | <80 |
| (**) Water permeability. Obtained from WVTR (Water vapor Transmission) measurement according to ASTM E 96/E 96M - 05 on 25 μm film thickness of each layer separately. Conditions 70° C., 100% relative humidity [g/m² · 72 h] | <16 | 16-22 | 23-33 | >33 |

|  | OK | NOK |
|---|---|---|
| (***) Air-conditioning fluid barrier. Calculated from Film value. [cm³/m² · day · atm] | <3 | >3 |
| (****) ZnCl₂ resistance. Failure time after introduction of ZnCl₂ solution on a tube section (width of section 5 mm ± 0.2 mm and tube 8 mm*1 mm) deformed to 30% (with stress retention). Analysis of the outer layer of structures. | 200 H | <1 H |

(***) The flow measurements were performed on films of the same composition as the layers of tubular structures with a permeation cell, by a Lyssy GPM500/GC coupling at a temperature of 23° C. and 0% relative humidity. The upper face of the cell is swept by the test gas, and the flow through the film in the lower part is measured by gas chromatography. Helium is used as a vector gas sweeping the lower part.

The permeation of tubular structures is calculated by the usual permeation law for a multilayer, namely:

$$\frac{e}{P} = \sum \frac{ei}{Pi}$$

e and P are the thickness and permeability of the multilayer structure ei and Pi are the thicknesses and permeabilities of each of the structure's layers Compositions CPA11: denotes a composition based on polyamide 11 with Mn (molecular mass by number) 29,000, containing 20% of ethylene/ethyl acrylate/anhydride type impact modifier in a mass ratio of 68.5/30/1.5 (MFI 6 at 190° C. under 2.16 kg), and of 1.2% of organic stabilizers consisting of 0.8% of phenol (Lowinox 44B25 from Great Lakes), of 0.2% of phosphite (Irgafos 168 from Ciba), of 0.2% of anti-UV (Tinuvin 312 from Ciba). The melting temperature of this composition is 190° C.

CPA610: denotes a composition based on polyamide 610 with Mn (molecular mass by number) 30,000, containing 1.2% organic stabilizers consisting of 0.8% phenol (Lowinox 44B25 from Great Lakes), 0.2% phosphite (Irgafos 168 from Ciba), 0.2% anti-UV (Tinuvin 312 from Ciba). The melting temperature of this composition is 223° C.

CPA66: denotes a composition based on polyamide 66 with Mn (molecular mass by number) 32,000, containing 1.2% of organic stabilizers consisting of 0.8% of phenol (Lowinox 44B25 from Great Lakes), of 0.2% of phosphite (Irgafos 168 from Ciba), of 0.2% of anti-UV (Tinuvin 312 from Ciba). The melting temperature of this composition is 264° C.

CPA6POF: denotes a composition based on polyamide 6 with Mn (molecular mass by number) 18,000, containing 40% of POF and 1.2% organic stabilizers consisting of 0.8% phenol (Lowinox 44B25 from Great Lakes), 0.2% phosphite (Irgafos 168 from Ciba), 0.2% anti-UV (Tinuvin 312 from Ciba). The melting temperature of this composition is 220° C.

POF: is a composition based on 50% ethylene/ethyl acrylate/maleic anhydride type impact modifier in mass ratio 68.5/30/1.5 (MFI 6 at 190° C. under 2.16 kg), 25% ethylene/ methyl acrylate/epoxide (GMA type) impact modifier, glycidyl methacrylate in mass ratio 67/25/8 with MFI 6 at 190° C. under 2.16 kg, and 25% ethylene/methyl acrylate/maleic anhydride type impact modifier, in mass ratio 76/18/6 with MFI 8 at 190° C. under 2.16 kg.

CPA1110TPOF: denotes a composition based on copolyamide 10.T/11 in mass proportion 68/32, with Mn (molecular mass by number) 20,000, containing 30% of POF and 1.2% organic stabilizers consisting of 0.8% phenol (Lowinox 44B25 from Great Lakes), 0.2% phosphite (Irgafos 168 from Ciba), 0.2% anti-UV (Tinuvin 312 from Ciba). The melting temperature of this composition is 255° C. POF is a composition based on 50% ethylene/ethyl acrylate/maleic anhydride type impact modifier in mass ratio 68.5/30/1.5 (MFI 6 at 190° C. under 2.16 kg), 25% ethylene/methyl acrylate/epoxide (GMA type) impact modifier, glycidyl methacrylate in mass ratio 67/25/8 with MFI 6 at 190° C. under 2.16 kg, and 25% ethylene/methyl acrylate/maleic anhydride type impact modifier, in mass ratio 76/18/6 with MFI 8 at 190° C. under 2.16 kg.

CPA610POF: denotes a composition based on polyamide 610 with Mn (molecular mass by number) 32,000, containing 20% of POF and 1.2% organic stabilizers consisting of 0.8% phenol (Lowinox 44B25 from Great Lakes), 0.2% phosphite (Irgafos 168 from Ciba), 0.2% anti-UV (Tinuvin 312 from Ciba). The melting temperature of this composition is 223° C.

CPA66plast: denotes a composition based on polyamide 66 with Mn (molecular mass by number) 30,000, containing 6% of BBSA (butyl benzene sulfonamide) plasticizer and 1.2% organic stabilizers consisting of 0.8% phenol (Lowinox 44B25 from Great Lakes), 0.2% phosphite (Irgafos 168 from Ciba), 0.2% anti-UV (Tinuvin 312 from Ciba). The melting temperature of this composition is 260° C.

CPA610plast: denotes a composition based on polyamide 66 with Mn (molecular mass by number) 32,000, containing 6% of BBSA (butyl benzene sulfonamide) plasticizer and 1.2% organic stabilizers consisting of 0.8% phenol (Lowinox 44B25 from Great Lakes), 0.2% phosphite (Irgafos 168 from Ciba), 0.2% anti-UV (Tinuvin 312 from Ciba). The melting temperature of this composition is 219° C.

The invention claimed is:

1. A multilayer tubular structure (MLT) intended for transporting a heat-transfer fluid,
    said multilayer tubular structure comprising:
    at least one first layer comprising a first composition comprising predominantly at least one long-chain polyamide having 10 to 15 carbon atoms per nitrogen atom and comprising at least 50% of aliphatic units relative to the sum of the units present in said long-chain polyamide,
    at least one second layer situated underneath said first layer comprising a second composition comprising predominantly at least one polyamide having 4 to 9 carbon atoms per nitrogen atom, said polyamide comprising at least 50% aliphatic units relative to the sum of the units present in said polyamide, said second composition comprising up to 12% polyolefins, relative to the total weight of said second composition, and up to 2% by weight of at least one plasticizer relative to the total weight of said second composition,
    optionally, a third layer comprising a third composition as defined for the first composition, or comprising a third prime composition comprising predominantly a short-chain polyamide with 4 to 7 carbon atoms per nitrogen atom and at least 20% by weight of at least one polyolefin relative to the total weight of said composition, or a fourth composition (4) comprising a polyamide comprising at least 50% semi-aromatic units,
    said first layer being devoid of continuous fibers,
    said second layer being in contact with said transported fluid when said optional layer is not present,
    and said second layer(s) representing at least 50% of the total thickness of the tube.

2. The multilayer tubular structure according to claim 1, wherein said first layer is the outermost layer of said multilayer tubular structure.

3. The multilayer tubular structure according to claim 1, wherein said first composition comprises up to 40% of at least one polyolefin.

4. The multilayer tubular structure according to claim 1, wherein said first composition comprises at least 3% by weight of at least one polyolefin, relative to the total weight of said first composition.

5. The multilayer tubular structure according to claim 1, said first composition comprising up to 4% by weight of at least one plasticizer relative to the weight of said first composition.

6. The multilayer tubular structure according to claim 1, wherein the first layer is devoid of plasticizer.

7. The multilayer tubular structure according to claim 1, wherein said second layer is devoid of plasticizer.

8. The multilayer tubular structure according to claim 1, wherein said second layer and said first layer are devoid of plasticizer.

9. The multilayer tubular structure according to claim 1, wherein all the layers present in said structure are devoid of plasticizer.

10. The multilayer tubular structure according to claim 1, wherein said second composition comprises up to 6% by weight of polyolefin, relative to the total weight of said second composition.

11. The multilayer tubular structure according to claim 1, wherein said second composition is devoid of polyolefin.

12. The multilayer tubular structure according to claim 1, wherein said polyamide of said second composition comprises at least 60% of aliphatic units relative to the sum of the units present in said polyamide.

13. The multilayer tubular structure according to claim 1, wherein said polyamide of second composition comprises at least 60% aliphatic units relative to the sum of the units present in said polyamide and said long-chain polyamide of said first composition comprises at least 60% aliphatic units relative to the sum of the units present in said long-chain polyamide.

14. The multilayer tubular structure according to claim 1, wherein said polyamide of said first composition consists of aliphatic units.

15. The multilayer tubular structure according to claim 1, wherein said polyamide of said composition consists of aliphatic units.

16. The multilayer tubular structure according to claim 1, wherein said polyamide of said second composition consists of aliphatic units and said long-chain polyamide of said first composition consists of aliphatic units.

17. The multilayer tubular structure according to claim 1, wherein said second composition is devoid of polyamides other than aliphatic polyamide(s).

18. The multilayer tubular structure according to claim 1, wherein said second composition and said first composition are devoid of polyamides other than aliphatic polyamide(s).

19. The multilayer tubular structure according to claim 1, wherein said second layer represents at least 70% of the total thickness of the tube.

20. The multilayer tubular structure according to claim 1, wherein two second layers are present and separated by a layer consisting of ethylene vinyl alcohol (EVOH) copolymer.

21. The multilayer tubular structure according to claim 1, wherein said at least one polyamide of layer is selected from PA11, PA12, PA1010 and PA1012.

22. The multilayer tubular structure according to claim 1, wherein said at least one aliphatic polyamide of layer is selected from PA6, PA66, PA6/66, PA610, PA410, PA412 and PA612.

23. The multilayer tubular structure according to claim 1, wherein said at least one polyamide of layer, when it is present, is selected from PA11, PA12, PA11/10T, PA6, PA66, PA6/66, PA610, PA410, PA412 and PA612.

24. The multilayer tubular structure according to claim 1, wherein said third layer is present, said third layer being internal and in contact with said transported fluid.

25. The multilayer tubular structure according to claim 24, wherein said internal third layer is present, said third composition being identical to first composition.

26. The multilayer tubular structure according to claim 1, wherein the heat-transfer fluid is a refrigerant fluid selected from hydrocarbon, hydrofluorocarbon, ether, hydrofluoroether, $CO_2$, $NH_3$, $SO_2$ and fluoroolefin compounds.

27. The multilayer tubular structure according claim 26, wherein the heat-transfer fluid is a refrigerant fluid selected from $CO_2$, fluoropropenes, fluoropropanes and fluoroethanes, and mixtures thereof.

28. The multilayer tubular structure according to claim 26, wherein the heat-transfer fluid is a refrigerant fluid selected from 1,3,3,3-tetrafluoropropene (1234ze) and 2,3,3,3-tetrafluoropropene (1234yf), particularly the heat-transfer fluid is 2,3,3,3-tetrafluoropropene (1234yf).

29. The multilayer tubular structure according to claim 26, wherein the refrigerant fluid contains a lubricant.

30. The use of a multilayer tubular structure as defined in claim 1, for transporting a heat-transfer fluid.

31. The use of a multilayer tubular structure as defined in claim 1, in order to satisfy an extractable test, said test particularly consisting of filling said multilayer tubular structure MLT with Forane and heating the assembly at 60° C. for 96 hours, then emptying it by filtering it into a beaker, then allowing the filtrate from the beaker to evaporate at ambient temperature and finally weighing this residue, the proportion of which must be less than or equal to approximately 6 $g/m^2$ of internal tube surface and the proportion of residue on the filter after filtering being less than or equal to 1 $g/m^2$.

* * * * *